United States Patent

Hsu et al.

[11] Patent Number: 5,940,459
[45] Date of Patent: Aug. 17, 1999

[54] HOST SIGNAL PROCESSOR MODEM AND TELEPHONE

[75] Inventors: Tseng Jan Hsu, Pleasanton; Wen-Liang Hsu, Milpitas, both of Calif.

[73] Assignee: PC-Tel, Inc., San Jose, Calif.

[21] Appl. No.: 08/677,485

[22] Filed: Jul. 9, 1996

[51] Int. Cl.$^6$ .................................................. H04L 23/00
[52] U.S. Cl. .......................................... 375/377; 395/872
[58] Field of Search ..................................... 375/222, 377, 375/220, 372, 259; 455/73, 75; 395/872, 889, 890; 379/67, 88; 370/468, 505

[56] References Cited

U.S. PATENT DOCUMENTS

| | | | |
|---|---|---|---|
| 4,965,641 | 10/1990 | Blackwell et al. | 375/7 |
| 5,129,036 | 7/1992 | Dean et al. | |
| 5,303,326 | 4/1994 | Dean et al. | |
| 5,323,426 | 6/1994 | James et al. | 375/118 |
| 5,355,302 | 10/1994 | Martin et al. | |
| 5,375,228 | 12/1994 | Leary et al. | 395/575 |
| 5,598,353 | 1/1997 | Heyl | 364/514 R |
| 5,611,038 | 3/1997 | Shaw et al. | 395/806 |
| 5,652,910 | 7/1997 | Boutaud et al. | 395/800 |
| 5,678,059 | 10/1997 | Ramaswamy et al. | 395/821 |
| 5,721,830 | 2/1998 | Yeh et al. | 395/200.67 |

Primary Examiner—Huy D. Vu
Assistant Examiner—Jean B. Corrielus
Attorney, Agent, or Firm—Skjerven, Morrill, MacPherson, Franklin & Friel LLP; David T. Millers; Hugh H. Matsubayashi

[57] ABSTRACT

A host signal processor (HSP) modem has a software interface between HSP modem hardware and native audio hardware in a host computer. No hard wire connections between modem hardware and audio hardware are required for synchronization. Instead, a software clock recovery system matches a transfer rate of the HSP modem hardware and a transfer rate of the audio hardware by duplicating or deleting samples. The software interface allows the native audio hardware to make audible the handshaking sequence during modem connections which eliminates the need for a speaker and speaker drivers in the modem hardware. The combination of HSP modem hardware, audio hardware, and software executed by the host computer also allows the HSP modem to perform voice communication such as telephone or speakerphone functions.

19 Claims, 3 Drawing Sheets

Microfiche Appendix Included
(1 Microfiche, 48 Pages)

HOST SIGNAL PROCESSOR MODEM AND TELEPHONE

REFERENCE TO MICROFICHE APPENDIX

The present specification comprises a microfiche appendix. The total number of microfiche sheets in the microfiche appendix is one. The total number of frames in the microfiche appendix is 48.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

This invention relates to systems including multipurpose modems which implement modem and telephone functions using resources such as processors and audio hardware which are native to host computers.

2. Description of Related Art

Multipurpose modems often incorporate digital data and fax functions with speakerphone and answering machine capabilities. Such modems typically have components which serve multiple purposes, such as a speaker which provides an audible sound for monitoring a handshake sequence between connecting modems and provides sound during telephone communications, but many functions require special hardware within the modem which increases the cost of the modem.

Host signal processor (HSP) modems have been developed which eliminate signal processors and other hardware in the modems in favor or software executed by the processor in a host computer. Software for such HSP modems performs many of the signal and data conversions required of a modem. Use of the host processor reduces modem hardware costs by reducing hardware in the modem. An efficient and inexpensive way to expand an HSP modem to provide standard telephone communications is desired.

SUMMARY OF THE INVENTION

In accordance with the invention, a communication system uses host signal processor (HSP) modem hardware, native audio hardware in a host computer, and procedures executed by the host computer to operate as a modem and a telephone. The native audio hardware provides audio output and/or input for telephone functions. The HSP modem hardware provides the required interface with telephone lines. Operating system protocols allow software communications between the HSP modem hardware and the audio hardware without any direct hardware connections between the HSP modem hardware and the audio hardware even though the audio hardware and HSP modem hardware operate asynchronously with independent sample clocks. A clock recovery procedure executed by the host computer matches data transfer rates and compensates for differences between the independent sample clocks.

The native audio hardware not only provides resources for expanding the HSP modem to include speakerphone functions but can also make a modem handshake sequence audible for user monitoring. Accordingly, no speakers or speaker driver circuits for monitoring handshake are required in the HSP modem hardware.

In one embodiment of the invention, a communication system includes an analog-to-digital converter or a codec which converts an analog signal from an input line such as a telephone line to digital samples accessible to a host computer having native audio hardware. Software executed by the host computer transfers the digital samples from the converter to the native audio hardware to provide audible sounds from signal receive on the input line. Digital samples from the host computer (i.e. from a program executed by the host computer or from the audio hardware) are converted to an analog output signal transmitted on an output line.

In one embodiment, a first index indicates where in a buffer new samples from the HSP modem hardware are transferred, and a second index indicates which samples in the buffer are transferred to the audio hardware. The first index leads the second index to provide a margin between where samples are written and where samples are read. Comparing the first index to the second index indicates whether a difference between the rates at which samples are written and read has increased or decreased the margin. Rates are equalized by duplicating or deleting samples to increase or decrease the margin. This prevents overflow or underflow of the buffer.

BRIEF DESCRIPTION OF THE DRAWINGS

Use of the same reference symbols in different figures indicates similar or identical items.

DETAILED DESCRIPTION OF THE PREFERRED EMBODIMENTS

In accordance with an embodiment of the invention, a host signal processor (HSP) modem includes a software interface between a hardware portion of the HSP modem and native audio hardware in a host computer. The native audio hardware and appropriate software expand the capabilities of the HSP modem to include voice communication such as telephone or speakerphone functions. The audio hardware is native to the host computer in the sense that the audio hardware provides a general purpose audio output and/or input and is not limited to or specifically for use with the HSP modem. Standard operating system protocols control transfers between the HSP modem and the audio hardware, and no special wire connections between modem hardware and audio hardware are required. A software clock recovery system in the HSP modem software matches transfer rates of the HSP modem hardware and transfer rates of the audio hardware even though the HSP modem hardware and the audio hardware have independent sampling clocks.

In one embodiment of the invention, the native audio hardware in the host computer makes handshaking sequences audible during modem connections. Accordingly, the cost of the HSP modem hardware is reduced by eliminating a speaker and driver circuits for monitoring handshake sequences.

Figure 1:
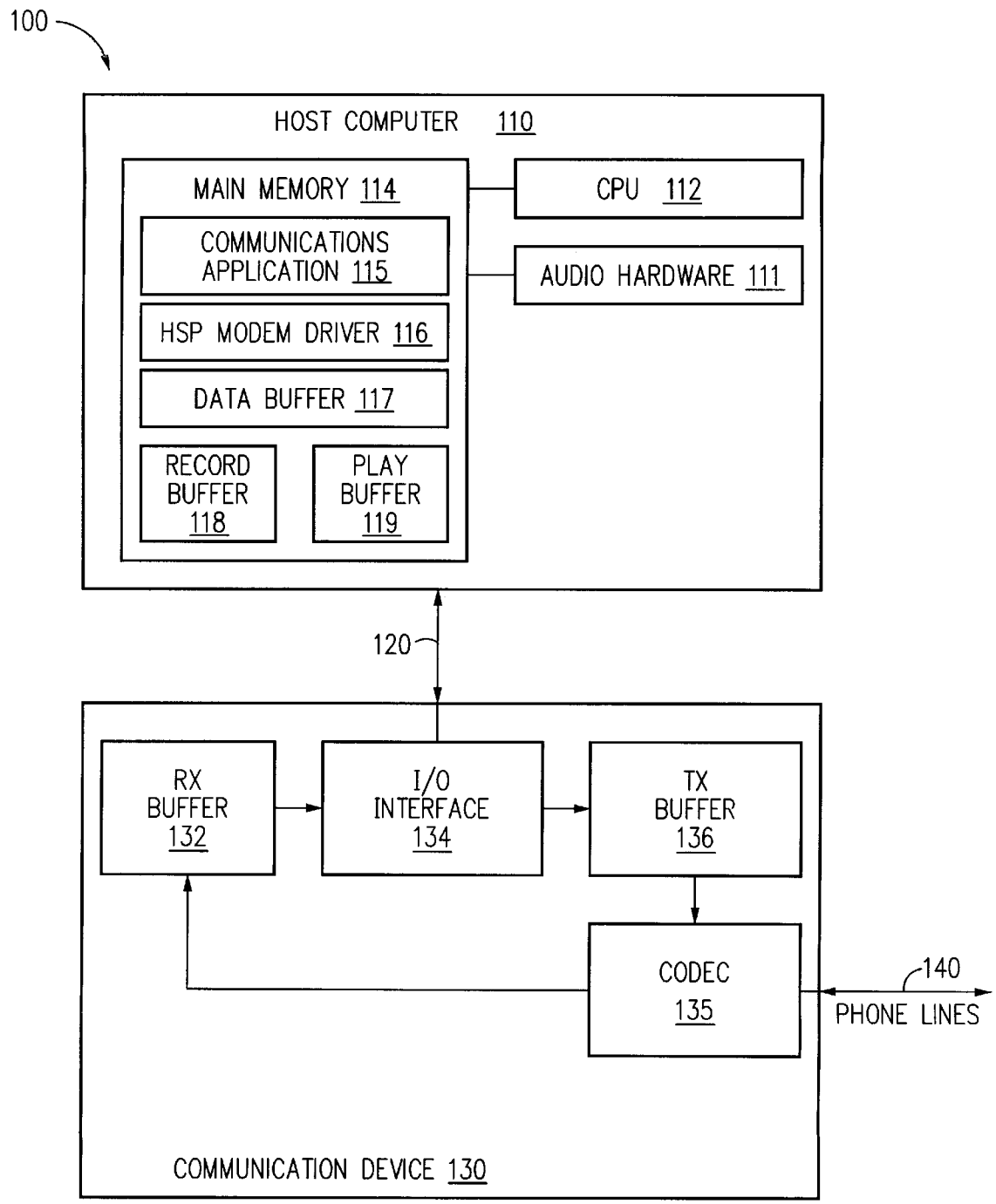
FIG. 1 is a block diagram of a communication system in accordance with an embodiment of the invention.

FIG. 1 shows an HSP modem 100 similar to the modem described in U.S. Pat. No. 5,787,305, entitled "Communications Interface and Conflict Avoidance Using a Software Simulation of a UART" and U.S. Pat. No. 5,721,830, entitled "Host Signal Processing Communication System that Compensates for Missed Execution of Signal Maintenance Procedures" which are both incorporated by reference herein in their entirety. HSP modem 100 includes a hardware portion (a communication device 130) having an I/O interface 134 connected to a bus 120, for example, a local bus in a host computer 110. Communications device 130 also includes a receive (Rx) buffer 132 and a transmit (Tx) buffer 136 and a codec 135 (combined analog-to-digital converter and digital-to-analog converter). Codec 135 connects to telephone lines 140, converts an analog signal from telephone lines 140 into digital samples which are stored in Rx buffer 132, and converts digital samples from Tx buffer 136 into an analog signal which is transmitted on telephone lines 140.

A processor 112 of host computer 110 executes an HSP modem driver 116 which retrieves samples from Rx buffer 132 and writes samples to Tx buffer 136 during periodic interrupts. For data or fax modem operations, driver 116 converts the digital samples from Rx buffer 132 according to a standard modem or fax protocol into digital data which are stored in a data buffer 117 for a communications application 115. Driver 116 also performs the reverse operation of retrieving digital data from data buffer 117, converting the data into digital samples, and transferring the digital samples to buffer 136 where codec 135 converts the digital samples into an analog signal complying with the standard modem protocol. Incorporated U.S. Pat. No. 5,721,830 further describes modem functions in HSP modem 100.

For telephone communications, audio hardware 111 which is native to the host computer 110 provides digital samples representing voice signals to be transmitted over telephone lines 140 and generates sound from digital samples representing incoming voice signals from telephone lines 140. Audio hardware 111 may, for example, include a sound card coupled to bus 120 and a microphone and a speaker coupled to an analog-to-digital converter (ADC) and digital-to-analog converter (DAC) on the sound card. HSP modem driver 116 when operating in a voice mode transfers digital samples without conversion according to the modem protocol because the digital samples represent an analog voice signal to be transmitted. Optionally, driver 116 filters or changes the magnitude of digital samples to change the quality or volume of voice signals. One type of filtering in a speakerphone application removes echoes caused by room acoustics.

Communications application 115 can turn on or off speakerphone operation of the HSP modem. To begin speakerphone operation, communications application 115 opens a communication port serviced by HSP modem driver 116 and then sends a command to place the HSP modem in speakerphone mode. Driver 116 or speakerphone software loaded by driver 116 then allocates in main memory 114, buffers 118 and 119 respectively for audio samples output from, and input to audio hardware 111. Software maintains data flow between communication device 130 and buffers 118 and 119 and maintains data flow between audio hardware 111 and buffers 118 and 119.

Feeding unconverted samples from communication device 130 through play buffer 119 to audio hardware 111 allows audio hardware 111 to play handshake sequences for monitoring of modem or fax connection. Simultaneous with transfer of unconverted samples, driver 116 converts the incoming samples according to the required modem protocol and generates the appropriate response for the handshake sequence. For handshake monitoring, audio hardware 111 requires audio output capabilities such as a sound card and a speaker but does not require audio input hardware such as a microphone. HSP modem hardware 130 can thus monitor handshake sequences without a speaker or other modem hardware conventionally associated with handshake monitoring in modems.

Figure 2:
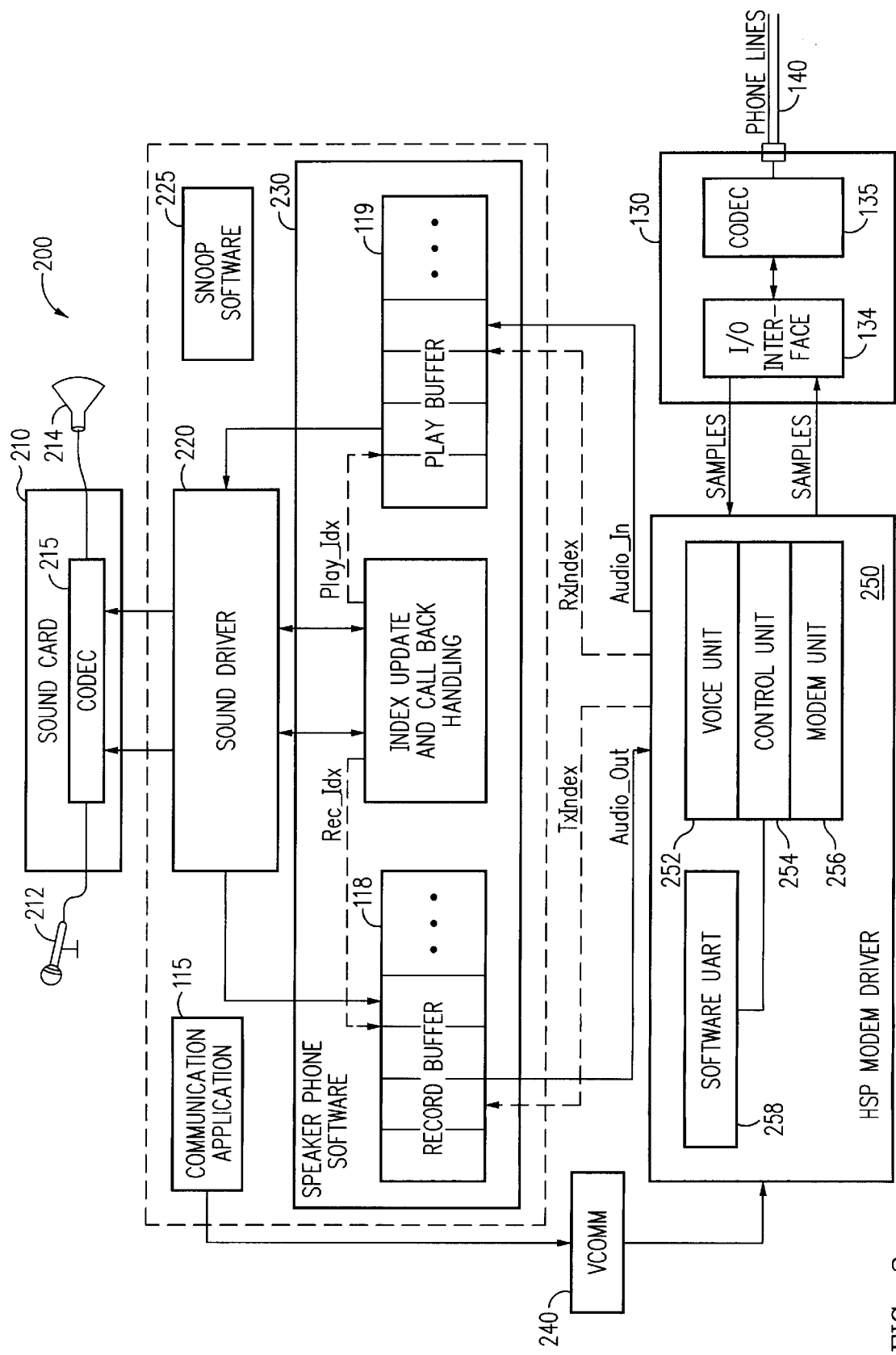
FIG. 2 illustrates functional elements of a speakerphone in accordance with an embodiment of the invention.

FIG. 2 illustrates an exemplary embodiment of a communication system 200 which includes HSP modem hardware (communication device 130) and audio hardware including a sound card 210, a microphone 212, and a speaker 214 which are native to a host computer. In an exemplary embodiment of system 200, the host computer is an IBM compatible personal computer that executes a software portion of system 200 under an operating system such as Microsoft Windows™ 95 or NT which provides for different priority levels of the software in system 200, an HSP modem driver 250 for device 130 executes at a higher priority (ring 0) and a communications application 115 and a sound driver 220 execute at a lower priority level (ring 3). Application 115 is a program for accessing multipurpose modems or speakerphones. Such applications are commercially available and include for example, "Microsoft Phone," available from Microsoft Corporation. Sound driver 220 creates a software interface for sound card 210. Such sound drivers are well known in the art and are normally provided with the operating system or sound card 210.

HSP modem driver 250 is a custom driver which implements modem and speakerphone operations. Driver 250 includes software units 252, 254, and 256 which for an operating system such as Windows 95, are static device drivers loaded into the system kernel when the operating system is started. Alternatively, units 252, 254, and 256 could be dynamic load device drivers which are loaded as required. To use the HSP modem, communications application 115 requests opening of the COM port assigned to the HSP modem. Communication application 115 sends the request to an operating system routine (VCOMM) which loads a custom port driver 258 into ring 0. In one embodiment of the invention, port driver 258 implements a software UART for interface to device 130 and software units 252, 254, and 256. For Windows 95, port driver 258 is a dynamic device driver executed in ring 0. Port driver 258 loads a small ring 3 software routine 225 into the system virtual machine for later use by HSP modem driver 250. The microfiche appendix contains a listing of a module PTS-NOOP which implements an example embodiment of routine 225.

Once port driver 258 is loaded into the host computer, the HSP modem is ready to receive standard modem commands. Communication application 115 sends an AT command (AT#CLS=8) to driver 250 via VCOMM 240 to initiate speakerphone functions. Port driver 258 passes the AT command to control software 254 which enables voice unit 252 and places the HSP modem in speakerphone mode. When first placed in speakerphone mode, voice unit 252 signals routine 225 to start speakerphone operation. Routine 225 allocates memory in the system virtual machine for record buffer 118 and play buffer 119 and then loads speakerphone software 230 into the system virtual machine. The microfiche appendix includes a listing of a module PTRTKR which is an embodiment of speakerphone software 230. Module PTRTKR is a dynamic load library for the Windows 95 operating system. Speakerphone software 230 sets up an interface with sound card 210 via sound driver 220, transmits the addresses of buffers 118 and 119 to voice unit 252, and then notifies sound card 210 and voice unit 252 that the system is ready for data transfer.

Communication between sound driver 220 and speakerphone software 230 can be conducted via standard sound card protocols such as MCI (multimedia control interface), "direct sound", or via sound card protocols specially for speakerphones. Under the MCI protocol, speakerphone software 230 requests that sound driver 220 write a block of audio samples from microphone 212 via codec 215 to record buffer 118 at a location indicated by an index Rec_Idx. Speakerphone software 230 also requests that sound driver 220 read and play a data block from play buffer 119 starting and an address indicated by an index Play_Idx. Codec 215 converts the block read into a signal driving speaker 214 and producing sound. Sound driver 220 typically reads or writes about 256 or 512 bytes of sound samples per request from speakerphone software 230. Upon completion of a block, sound driver 220 makes a callback to speakerphone software 230 which triggers a requested for transfer of a next block.

Driver 250 transfers data from communication device 130 to play buffer 119 and from record buffer 118 to communication device 130. In accordance with one embodiment of the invention, device 130 generates periodic interrupts which driver 250 services by transferring digital samples. During each interrupt, driver 250 writes 24 samples to communication device 130 and reads 24 samples from communication device 130. However, the number of these samples written to or read from buffers 118 and 119 depends on a clock recovery process conducted by voice unit 252. Ideally, the rates of data input to buffers 118 and 119 matches the rates of data output; but since device 130 and sound card 210 typically operate asynchronously, difference in clock frequencies for device 130 and sound card 210 if left uncorrected can cause data overflow or underflow of buffer 118 and/or 119. A hardware connection between sound card 210 and device 130 could synchronize clocks, but most native sound cards do not provide for such hardware connections.

In accordance with an aspect of the invention, a software clock recovery process adjusts data transfer rates to prevent data overflow or underflow. Initially record index Rec_Idx, which indicates where sound driver 220 writes samples, leads an index TxIndex, which indicates where driver 250 reads samples by a fixed amount. For example, index Rec_Idx can initially lead index TxIndex by two full requests of data blocks from sound driver 220. This lead change if a data transfer rate into buffer 118 differs from a data transfer rate out of buffer 118. Sound card 210 writes sound samples to record buffer 118 at the sampling frequency of codec 215, for example, at a nominal rate of 8 kHz; and in response to each callback, speakerphone software 230 shifts index Rec_Idx to the next block in buffer 118 in a circular fashion. Accordingly, index Rec_Idx advances at a rate depending on the sampling frequency of codec 215. During the periodic interrupts for device 130, driver 250 reads sound samples from record buffer 118 and updates index TxIndex. To prevent overflows or underflows of record buffer 118, driver 250 compares index TxIndex to index Rec_Idx at each interrupt. If index Rec_Idx leads index TxIndex by less than Y bytes, (for example, less than 1 block transfer by sound driver 220), the rate at which samples are read from buffer 118 is reduced by duplicating one or more samples from buffer 118 in a block of 24 samples written to communication device 130. For example, 23 samples are read from record buffer 118 and index TxIndex is increased by 23, but the last of the 23 samples read is duplicated to form a block of 24 samples written to communication device 130. If Rec_Idx leads TxIndex by more than Z bytes, (for example more than 3 block transfers), one or more samples is skipped over so that TxIndex is increased by more than 24 and effective rate at which samples are read from buffer 118 is increased. In this fashion, the rate of reading data from record buffer 118 adjusts to avoid overflowing or underflowing buffer 118.

Similarly, driver 250 balances the read and write rates for play buffer 119 by comparing indices RxIndex and Play_Idx during each interrupt and adjusting the amount of data written to play buffer 119. If index RxIndex leads index Play_Idx by less than Y bytes, one or more samples is duplicated to increase the amount of data written to play buffer 119 during an interrupt. If index RxIndex leads index Play_Idx by more than Z bytes, one or more samples is deleted to reduce the amount of data written to play buffer 119 during an interrupt. Accordingly, continuous voice communications on telephone lines 140 are maintained with out overflowing or underflowing buffers 118 and 119 and disrupting the sound signal.

Figure 3:
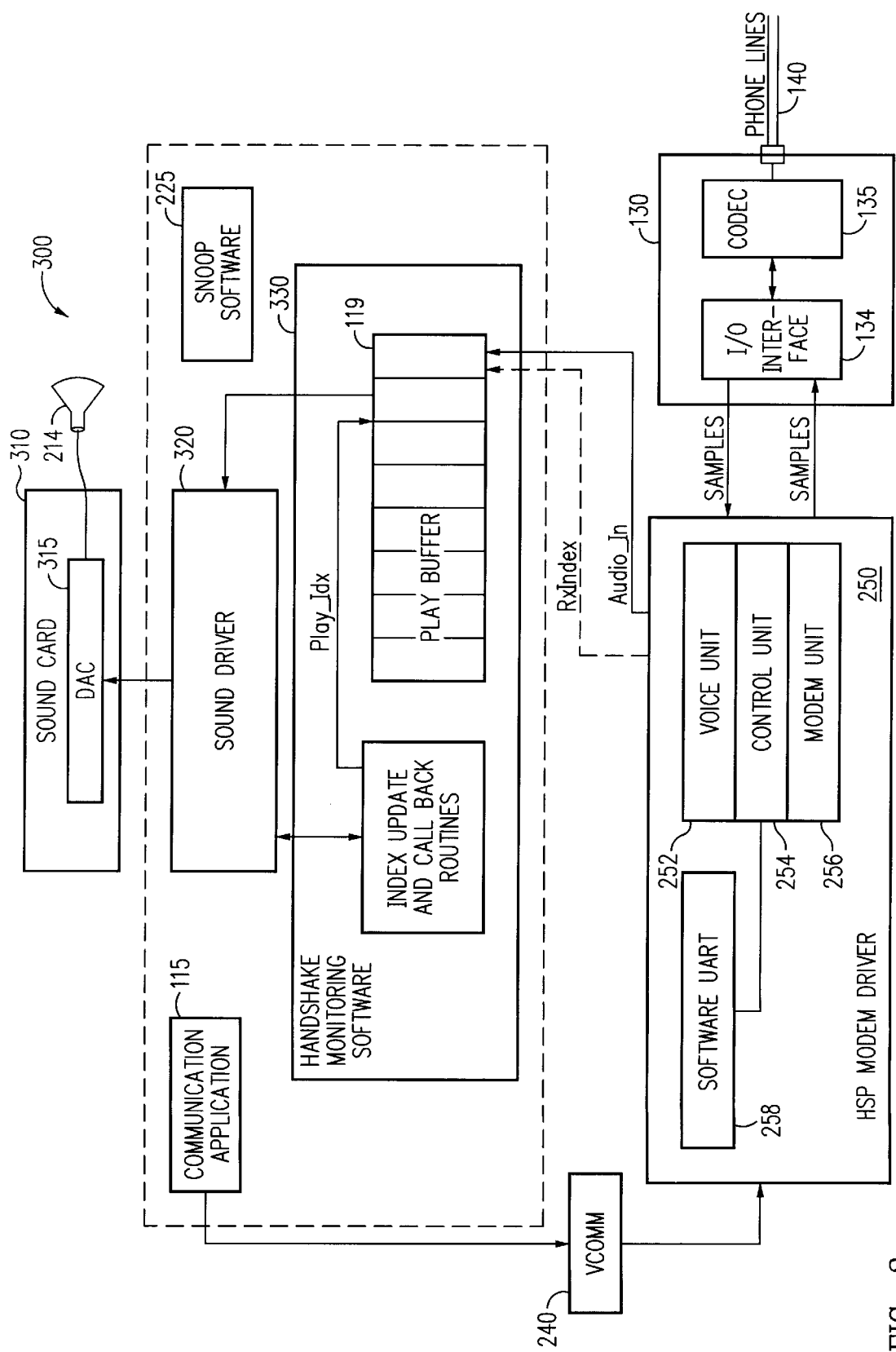
FIG. 3 illustrates an HSP modem implementing handshake monitoring through audio hardware native to a host computer.

In addition to, or instead of using native audio hardware for voice communication, an HSP modem in accordance with another embodiment of the invention uses native audio hardware to provide an audible signal for monitoring modem dialing and handshaking sequences. FIG. 3 illustrates an HSP modem 300 which uses a sound card 310 for modem monitoring. HSP modem 300 includes a hardware portion (device 130) and HSP modem driver 250. As described above, HSP driver 250 includes software units 252, 254, and 256 which are loaded into ring 0 at start-up of the operating system, and port driver 258 and routine 225 are respectively loaded into ring 0 and ring 3 in response to communication application 115 requesting that VCOMM 240 open the COM port corresponding for device 130. At that point, the HSP modem is ready to receive standard AT commands from communication application 115.

The HSP modem enables a monitoring mode in response to a dial command (ATD) or a ring signal on telephone line 140 when the HSP modem has been set to answer incoming calls. Whether the HSP enters an audible modem monitoring mode depends on standard AT commands which configure the modem. For example, a user can disable handshake sequence monitoring, can monitor just the handshake sequence, or can monitor modem signals even after the modem connection. To enter monitoring mode, voice unit 252 signals software 225 to allocate memory for play buffer 119 and load handshake monitoring software 330 into ring 3. Handshake monitoring software 330 sets up an interface with sound card 310 via an associated sound driver 320, transmits the address of buffer 119 to voice unit 252, and the notifies sound card 210 and voice unit 252 that the system is ready for data transfer.

For handshake sequence monitoring, digital samples are transferred only in one direction, from device 130 to sound card 210. Accordingly, only play buffer 119 (and not record buffer 118) is allocated. Further, sound card 310 does not require a microphone or an ADC for sound input. A DAC 315 and driver circuits for speaker 214 are sufficient to produce an audible handshake sequence.

The handshake sequence consists of an output signal from the HSP modem of system 300 and an input signal generated from a modem or other remote device connected to telephone lines 140. Modem unit 256 generates the output signal which initiates handshaking or responds as required by the desired modem protocol. Voice unit 252 transfers digital samples of an input analog signal on telephone lines 140 to play buffer 119 during interrupts as described above in regard to FIG. 2. Sound card 310 plays these samples to generate a sound indicating the progress of the handshake sequence. The output signal from the HSP modem is audible in the sound played by sound card 310 because the output signal echoes back on telephone line 140 and is represented in the samples transferred by voice unit 252 to play buffer 119.

In monitoring mode, voice unit 252 implements the clock recovery routines as described in regard to FIG. 2. In particular, voice unit 252 monitors the difference between index RxIndex and index Play_Idx and duplicates samples from device 130 to increase the rate of input to play buffer 119 if the difference becomes too small. To decrease the rate of data transfer into play buffer 119, some samples from device 130 are skipped rather than transferred to play buffer 119 if the difference between index RxIndex and index Play_Idx becomes too large. Accordingly, input and output rates for buffer 119 are kept about equal to prevent buffer overflow or underflows.

If the HSP modem is configured to stop monitoring upon a connect, modem unit 256 signals voice unit 252 to exit monitoring mode when modem unit 256 senses either a successful "connect" to the remote device or a failed handshake sequence. For a successful connect, modem communication can continue with or without audible monitoring of the signals transferred on telephone line 140 depending on the configuration of the HSP modem. When exiting monitoring mode, voice unit 225 signals software 225 to unload handshake monitoring software 330 and release memory allocated to play buffer 119.

Although the present invention has been described with reference to particular embodiments, the description is only an example of the invention's application and should not be taken as a limitation. In particular, although most of the above disclosure above is directed to modems which connect to standard telephone lines, aspects of the invention can also be applied to applications such as cable modems for connection to proposed cable televisions system. Additionally, although example speakerphone applications are described, embodiments of the invention can also be applied to other voice communication functions such as telephone answering machines. Various other adaptations and combinations of features of the embodiments disclosed are within the scope of the invention as defined by the following claims.

We claim:

1. A communication system comprising:
   a host computer which includes native audio hardware capable of generating audible output from the host computer, wherein the audio hardware processes digital samples according to a first sampling clock;
   a communication device comprising: an interface coupled to the host computer; and an analog-to-digital converter coupled to the interface, the analog-to-digital converter converting an analog signal from an input line to digital samples accessible by the host computer through the interface, wherein the communication device processes digital samples according to a second sampling clock which is asynchronous to the first sampling clock; and
   software executed by the host computer, the software transferring the digital samples from the communication device to the native audio hardware which plays the digital samples, the software comprising a procedure which transfers digital samples from the communication device to a buffer in a memory of the host computer, wherein the procedure duplicates or deletes samples to equalize a data transfer rate from the communication device and a data transfer rate to the audio hardware, wherein:
   samples from the communication device are transferred to a location the buffer, indicated by a first index;
   samples are transferred to the audio hardware from a location in the buffer, indicated by a second index; and
   the procedure compares the first index to the second index and determines from a difference between the first and second indices whether to duplicate or delete samples being transferred to the buffer.

2. The communication system of claim 1, wherein:
   the communication device further comprises a digital-to-analog converter coupled to the interface, the digital-to-analog converter converting digital samples from the interface into an analog signal transmitted on an output line; and
   the software further comprises a second procedure which transfers digital samples from a second buffer in the memory of the host computer to the communication device, wherein the second procedure duplicates or deletes samples to equalize a data transfer rate to the communication device and a data transfer rate from the audio hardware.

3. The communication system of claim 1, wherein:
   the communication device further comprises a digital-to-analog converter coupled to the interface, the digital-to-analog converter converting digital samples from the interface into a transmitted analog signal on an output line; and
   the software transfers digital samples from the audio hardware to the communication device for conversion to transmitted analog signal.

4. The communication system of claim 1, wherein the software provides voice communications when operated in a first mode during which digital samples are transferred between the audio hardware and the communication device and provides modem functions when operated in a second mode during which digital samples are converted according to a modem protocol to generate data.

5. The communication system of claim 4, wherein the input line is a telephone line, and the communication system provides voice and modem communications through the communication device.

6. A host signal processor modem comprising:
   a communication device comprising an interface for connection to a host computer, and an analog-to-digital converter which converts analog signals from an input line to digital samples accessible to the host computer through the interface; and
   software executed by the host computer, the software including a procedure which during a handshake sequence for the host signal processor modem, transfers digital samples from the communication device to audio hardware native to the host computer, the audio hardware playing the digital samples to allow user monitoring of the handshake sequence, wherein:
   samples from the communication device are transferred to a location in a buffer, indicated by a first index;
   samples are transferred to the audio hardware from a location in the buffer, indicated by a second index; and
   the procedure compares the first index to the second index and determines from a difference between the first and second indices whether to delete or duplicate samples being transferred to the buffer, whereby the software deletes or duplicates digital samples being transferred, as necessary to equalize a transfer rate from the communication device and a transfer rate to the audio hardware.

7. The host signal processor modem of claim 6, wherein the communication device generates an audible modem handshake sequence solely through audio hardware native to the host computer.

8. The host signal processing modem of claim 6, wherein for voice communications, the procedure transfers digital samples from the communication device to the audio hardware native to the host computer.

9. The host signal processing modem of claim 8, wherein the input line is a telephone line.

10. The host signal processing modem of claim 6, wherein the procedure transfers digital samples from the communication device to a modem unit for conversion according to a protocol for modem communications.

11. A host signal processor modem comprising:
   a communication device comprising an interface for connection to a host computer, and an analog-to-digital converter which converts analog signals from an input line to digital samples accessible to the host computer through the interface;
   software executed by the host computer, the software including a procedure which during a handshake sequence for the host signal processor modem, transfers digital samples from the communication device to audio hardware native to the host computer, the audio hardware playing the digital samples to allow user monitoring of the handshake sequence; and
   a buffer in a memory of the host computer, wherein samples from the communication device are transferred from the communication device to a location in the buffer, indicated by a first index and samples are transferred to the audio hardware from a location in the buffer, indicated by a second index, wherein:
      the audio hardware processes digital samples according to a first sampling clock;
      the communication device processes digital samples according to a second sampling clock which is asynchronous to the first sampling clock; and
      the software comprises a procedure that compares the first index to the second index and determines from a difference between the first and second indices whether to duplicate or delete digital samples.

12. The host signal processor modem of claim 11, wherein the communication device generates an audible modem handshake sequence solely through audio hardware native to the host computer.

13. The host signal processing modem of claim 11, wherein for voice communications, the procedure transfers digital samples from the communication device to the audio hardware native to the host computer.

14. The host signal processing modem of claim 13, wherein the input line is a telephone line.

15. The host signal processing modem of claim 11, wherein the procedure transfers digital samples from the communication device to a modem unit for conversion according to a protocol for modem communications.

16. A method for operating a host signal processor modem, comprising:
   transferring digital samples from an analog-to-digital converter in a hardware portion of the host signal processor modem to a buffer in a host computer which executes a software portion of the host signal processor modem; and
   using audio hardware native to the host computer to play the digital samples from the buffer, wherein transferring the digital samples comprises:
      transferring samples from the hardware portion of the host signal processor modem to a location in the buffer, indicated by a first index;
      transferring samples to the audio hardware from a location in the buffer, indicated by a second index; and
      determining from a difference between the first and second indices whether to duplicate samples being transferred; and
   duplicating digital samples from the hardware portion of the host signal processor modem to increase a data transfer rate to the buffer and match a rate at which the audio hardware plays the digital samples from the buffer.

17. The method of claim 16, wherein the digital samples represent an analog signal input to the host signal processor during a handshake sequence.

18. A method for operating a host signal processor modem, comprising:
   transferring digital samples from an analog-to-digital converter in a hardware portion of the host signal processor modem to a buffer in a host computer which executes a software portion of the host signal processor modem; and
   using audio hardware native to the host computer to play the digital samples from the buffer, wherein transferring the digital samples comprises:
      transferring samples from the hardware portion of the host signal processor modem to a location in the buffer, indicated by a first index;
      transferring samples to the audio hardware from a location in the buffer, indicated by a second index; and
      determining from a difference between the first and second indices whether to skip transfer of some digital samples; and
   skipping transfer of some digital samples from the hardware portion of the host signal processor modem to decrease a data transfer rate to the buffer and match a rate at which the audio hardware plays the digital samples from the buffer.

19. The method of claim 18, wherein the digital samples represent an analog signal input to the host signal processor during a handshake sequence.

* * * * *

UNITED STATES PATENT AND TRADEMARK OFFICE
CERTIFICATE OF CORRECTION

PATENT NO.   : 5,940,459
ISSUE DATE   : 08/17/99
INVENTORS    : Tseng J. Hsu and Wen-Liang Hsu It is certified that error appears in the above-identified patent and that said Letters Patent is hereby corrected as shown below:

At Column 8, line 32, after "to" and before "transmitted" insert --the--.

Signed and Sealed this

Sixteenth Day of January, 2001

Attest:

Q. TODD DICKINSON

*Attesting Officer*  *Commissioner of Patents and Trademarks*